United States Patent [19]

Loscuito

[11] Patent Number: 4,953,733
[45] Date of Patent: Sep. 4, 1990

[54] ELECTRICAL OUTLET BOX MARKING DEVICE

[76] Inventor: Gaetano R. Loscuito, 7100 W. Stamford Dr., Bridgeview, Ill. 60455

[21] Appl. No.: 441,986
[22] Filed: Nov. 28, 1989
[51] Int. Cl.⁵ .............................................. B25H 7/04
[52] U.S. Cl. ...................... 220/3.4; 220/3.8; 30/366; 33/528; 33/DIG. 10
[58] Field of Search ...................... 220/3.4, 3.5, 3.8; 30/366; 33/DIG. 10, 528

[56] References Cited

U.S. PATENT DOCUMENTS 3,888,013  6/1975  Benoit .................................... 33/528
3,940,857  3/1976  Giordano ............................... 33/528

Primary Examiner—Stephen Marcus
Assistant Examiner—Stephen Cronin
Attorney, Agent, or Firm—Terry M. Geinstein

[57] ABSTRACT

A marking device is used in conjunction with an electrical outlet box to mark a wall panel with the exact and precise location of that outlet box so the panel can be cut to accommodate such outlet box. The marking device includes an I-shaped body having ears on each corner of a rectangular shaped central body. An anchoring element is attached to each ear and extends far enough to fictionally engage the outlet box, and a biplanar arrow-shaped marking element is also attached to each ear.

1 Claim, 2 Drawing Sheets

4,953,733

ELECTRICAL OUTLET BOX MARKING DEVICE

TECHNICAL FIELD OF THE INVENTION

The present invention relates to the general art of building elements, and to the particular field of elements used in conjunction with the installation of electrical outlet boxes.

BACKGROUND OF THE INVENTION

As is well known, many building structures include interior wall panels, sometimes known as "Sheetrock" or the like. Most building structures also include a plurality of electrical wall outlets as well.

In cutting a wall panel to accommodate a wall outlet box, even the most experienced artisan in the electrical wiring art sometimes experiences difficulties, and must always be exceptionally careful in cutting through the interior wall of a building in order to get the right size opening, at the proper location for the outlet box which is located on the opposite side of the wall.

Accordingly, the building art has included several proposals for accurately defining the location of an electrical wall outlet before cutting the wall panel. However, marking devices, such as that disclosed in U.S. Pat. No. 2,898,688, often are somewhat cumbersome to use and are not amenable to a variety of applications. For example, these devices generally are used before the receptacle element is installed into the outlet box thereby requiring the electrician to work through the wall panel to install such element. Not only is this slightly inconvenient for the electrician, it may create a possibility of damaging the wall panel.

Furthermore, marking devices, such as that disclosed in the aforementioned patent, include elements which are superfluous in many instances and thus can be overly expensive to manufacture and sell as well as difficult to use.

Therefore, there is a need for a marking device which can be used with or without the electrical receptacle element installed in the outlet box and which is inexpensive to manufacture and which is easy to use as compared to existing marking devices.

OBJECT OF THE INVENTION

It is a main object of the invention to provide a marking device which can be used with or without the electrical receptacle element installed in the outlet box.

It is another object of the invention to provide a marking device which can be used with or without the electrical receptacle element installed in the outlet box and which is inexpensive to manufacture.

It is another object of the invention to provide a marking device which can be used with or without the electrical receptacle element installed in the outlet box and which is inexpensive to manufacture and which is easy to use as compared to existing marking devices.

SUMMARY OF THE INVENTION

These, and other, objects are achieved by a marking device which is formed of only one piece of material to be monolithic and which is formed to be usable with or without the electrical receptacle element installed in the outlet box.

In this manner, the marking device is formed of a minimum number of parts and is thus inexpensive to manufacture and sell, yet is easy and versatile to use.

DETAILED DESCRIPTION OF THE PREFERRED EMBODIMENT OF THE INVENTION

Figure 1:
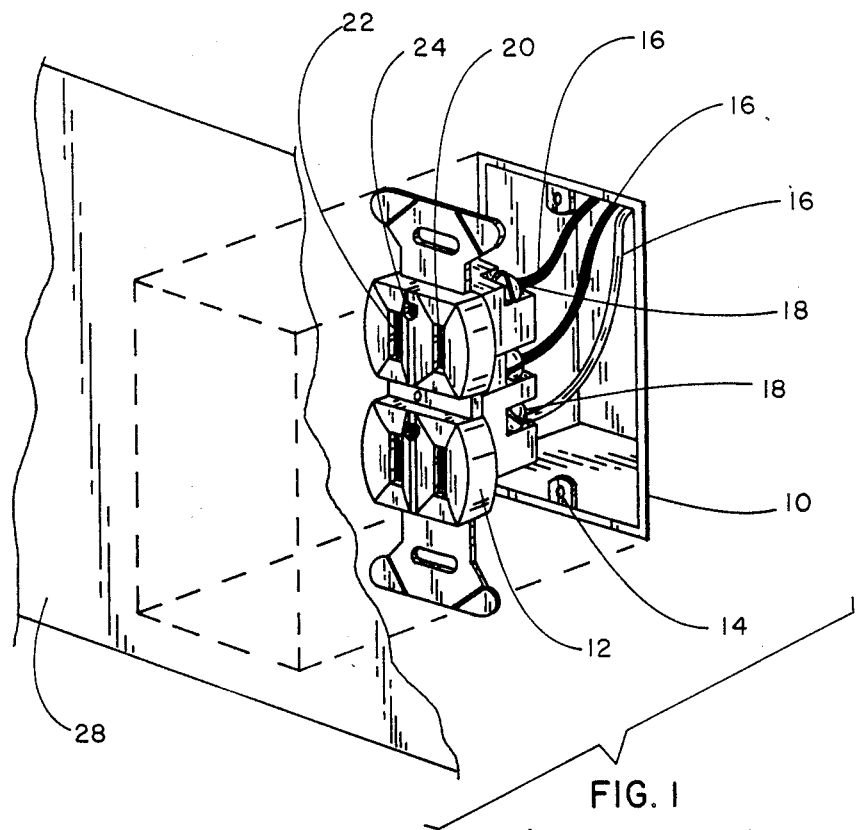
FIG. 1 is a perspective view of an outlet box with an electrical receptacle therein in conjunction with a wall panel.

Shown in FIG. 1 is a junction box/outlet box 10 that is adapted to be mounted on a wall stud or the like and which is used to contain a receptacle 12 therein via a mounting tab 14, or the like. The receptacle includes the usual wires 16 connected thereto by terminals 18 and which lead to the utility hookup in the usual manner for connecting the receptacle neutral slot 20, the hot slot 22 and the ground slot 24 to the appropriate circuit portions.

A wall panel 28 is also mounted on the wall framing elements and covers the receptacle and the outlet box to finish the wall. Therefore, the wall panel must be cut to the size, shape and location of the outlet box 10 so that the receptacle will be accessible after the wall panel is in place.

This cutting of the wall panel has caused some difficulties in the art and thus devices such as the aforementioned marking device in U.S. Pat. No. 2,898,688 have been used. Such devices generally are not amenable for use after the receptacle 12 has been mounted in the outlet box 10.

As is well known, the connection of these wires to the receptacle requires some manual manipulation and is generally done after the outlet box 10 is mounted in the wall framing element. Therefore, if the receptacle 12 cannot be mounted prior to erection of the wall panel, there may be danger that the wall panel will be damaged during such precess.

Therefore, the present invention is embodied in a monolithic marking device 30 that can be used before or after the receptacle 12 is mounted in the outlet box 10.

Figure 2:
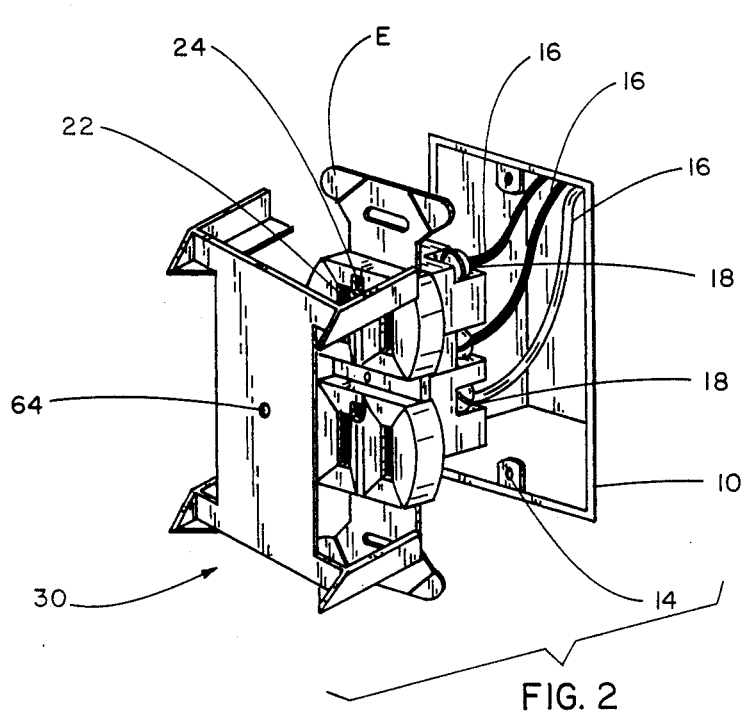
FIG. 2 is a perspective view of an outlet box in conjunction with an electrical receptacle and further in conjunction with a marking device of the present invention in position to be mounted on the outlet box for marking the wall panel.

As is best shown in FIG. 2, the marking device 30 fits into the outlet box 10 and can cover the receptacle if such element has been mounted in the outlet box prior to marking the wall panel. The marking device 30 can also be used prior to mounting the receptacle if so desired.

Figure 3:
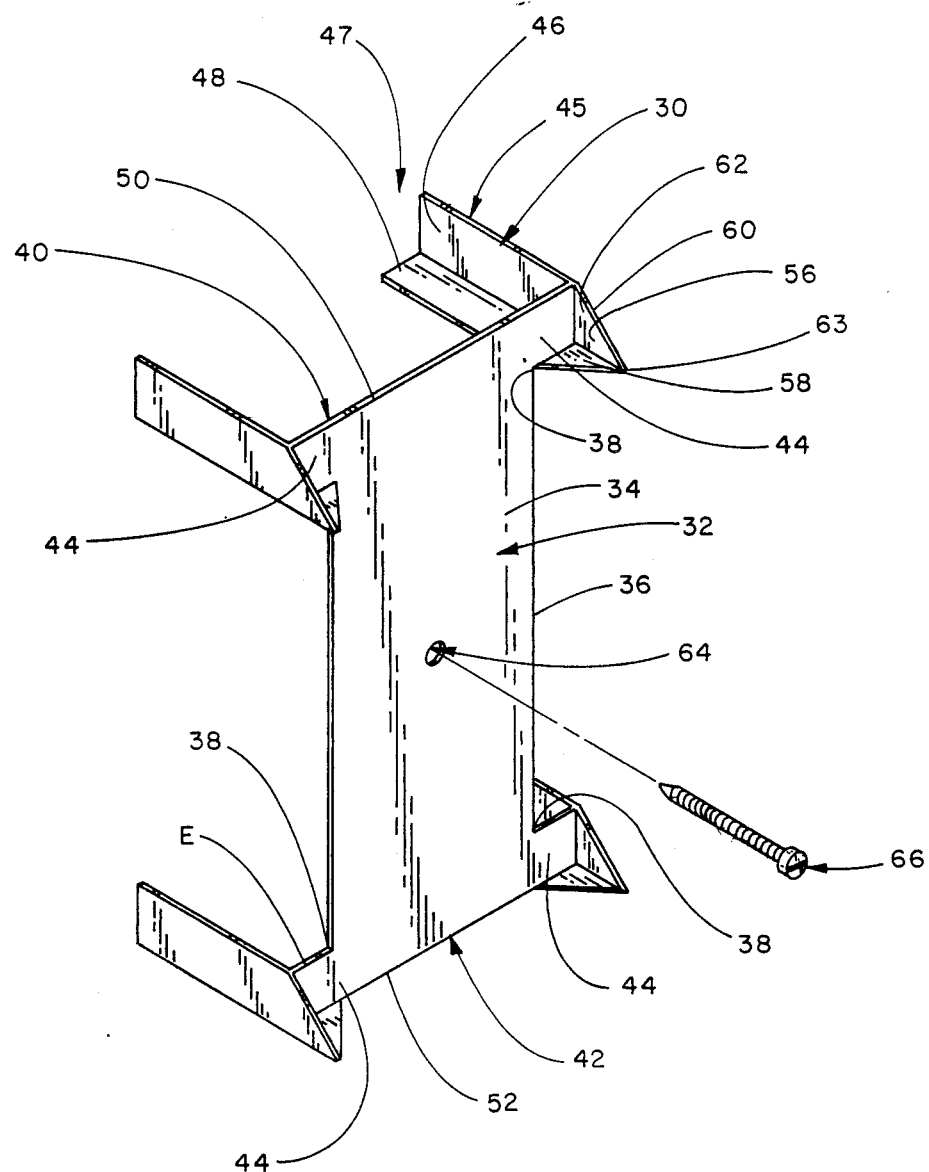
FIG. 3 is a perspective view of the monolithic marking device of the present invention.

The marking device 30 is best shown in FIG. 3, and attention is now directed thereto.

The monolithic marking device 30 includes an I-shaped plate element 32 having a rectangular central body portion 34 that is defined by side edges 36 that terminate at "ends" 38. As shown, the central body portion really has no ends, but for the sake of description, it will be assumed that such ends, if they existed, are adjacent to the termination of the side edges. Being rectangular, the central body portion includes four corners. The I-shape is formed by a top portion 40 and a bottom portion 42 which extend beyond the side edges 36 of the central body portion to form ears 44. The central body portion includes a rear surface 45 that will be presented into the outlet box and a front surface 45' that will be presented toward the wall panel.

Each ear has an anchoring element, such as anchoring element 45, on one side thereof and a marking element, such as marking element 47, on the other side thereof. The anchoring element is located adjacent to the rear surface 45 to be inside the outlet box and to engage the surfaces of that outlet box; whereas, the marking elements are located adjacent to the front surface 45' to engage the wall panel covering the outlet box.

The anchoring elements are located to fit between the ear portions E of the receptacle and the outlet box as indicated in FIG. 2 so that the receptacle can be mounted in the outlet box and the marking device can still be mounted on the outlet box with the anchoring elements being inserted between the receptacle and the inside surfaces of the outlet box.

Each of the anchoring elements is L-shaped with a first leg 46 extending parallel to the side edges 36 and a second leg 48 extending parallel to the top and bottom edges 50 and 52 of the top and bottom elements 40 and 42. The first leg is positioned to be flush and coplanar with the outer end edge of the ears, and the second leg is positioned to be flush and coplanar with the bottom of such ears. The first and second anchoring element legs are oriented to be perpendicular to each other. The anchoring elements extend rearwardly far enough to ensure a stable mounting of the marking device on the outlet box, yet not so far as to make it difficult to remove the marking device from the outlet box when desired. The mounting is a friction fit and vagaries in the dimensions of the outlet boxes can be accommodated by bending the anchoring elements as necessary. The ideal length of an anchoring element is approximately half the length of the central body portion 34 as measured between the bottom end edges of the ears so that a secure friction fit can be established yet different outlet box dimensions can be accommodated.

As is shown in FIG. 3, the marking elements are arrow-head shaped and extend forwardly of the front of the central body portion far enough to contact the rear surface of a wall panel and to mark such wall panel in a manner that will allow a precise cutout to be made.

The marking elements thus include a first leg, such as first leg 56, that is located to be a co-planar extension of the anchoring element first leg 46 and a second leg, such as second leg 58, that is oriented to be perpendicular to the first leg and is located to be a co-planar extension of the anchoring element second leg 48. The marking element legs are triangular in shape to include a hypotenuse, such as hypotenuse 60 on leg 56 that extends from a base 62 to a point-forming apex 63 that is spaced from the ear 44. The point-forming apexes of each marking element leg lie adjacent to each other to form a biplanar arrow head shape that will mark the wall panel in a conspicuous manner.

The marking device 30 also includes a fastener-receiving hole 64 defined centrally of the central body portion to receive a fastener 66 that is used to attach the marking device to either the receptacle or to the outlet box if either of such elements includes a suitable fastener-receiving hole.

The use of the marking device of the present invention is evident from the foregoing description, and thus will not be presented in detail. It being noted that the marking device is easily mounted on the outlet box and includes a minimum number of anchoring elements to securely mount the device so that the device can be manufactured in an inexpensive manner, yet will be securely mounted in an expeditious manner. The four marking elements is the minimum number required to define an outlet box outline on the wall panel in a manner that can be expeditiously marked and cut by the electrician.

The device is mounted on an outlet box, and the wall board is pressed in position against the marking elements that protrude out of the plane of the outlet box. The four corners of the outlet box are thus defined in the wall panel, and that panel can be suitably cut. The marking device is then easily removed from the outlet box, and the wall panel can be installed. The receptacle 12 is already mounted prior to the marking of the wall panel and thus any vagaries associated with the electrical receptacle mounting in the outlet box can be accounted for in the marking of the wall panel. That is, if, for example, the receptacle is mounted slightly off-center in the outlet box, the electrician can see this prior to cutting the wall panel using the device of the present invention.

It is understood that while certain forms of the present invention have been illustrated and described herein, it is not to be limited to the specific forms or arrangements of parts described and shown.

I claim:

1. A marking device for defining the exact location of an electrical outlet box in a wall panel consisting of:

an I-shaped monolithic plate element having a rectangular central body portion having a front surface and a rear surface, side edges and a fastener-receiving hole defined centrally therein, a top portion and a bottom portion, said top portion having a top end edge, and said bottom portion having a bottom end edge, said top and bottom portions extending transversely of said central body portion side edges and extending beyond said side edges and forming ears on the four corners of said rectangular central body portion, each of said ears including a top edge and a bottom edge, with said top edges being collinear with said top end edge and said bottom end edge associated therewith;

each ear having an anchoring element located adjacent to said rear surface of said central body portion and a marking element adjacent to said central body portion front surface, each of said anchoring elements being L-shaped and each including a first leg that extends parallel to the central body portion side edges and is located to be coplanar with one ear end edge, and a second leg that is located to be coplanar with an ear bottom edge and to be essentialy perpendicular to said first leg, said anchoring elements being essentially half the length of said central body portion as measured between the bottom end edges E of the ears;

each of said marking elements being arrow-head shaped and including a first leg that is positioned to be coplanar with said anchoring element first leg and a second leg that is positioned to be coplanar with said anchoring element second leg, said marking element legs each being triangular in shape and including a base attached to an associated ear and a point-forming apex spaced from the ear with a hypotenuse connecting said base and said apex, said marking element legs being perpendicularly arranged to define a biplanar point.

* * * * *